July 2, 1963    J. B. THOMAS    3,095,843
PASSAGEWAY PANEL EXPANSION APPARATUS
Filed Feb. 13, 1958    3 Sheets-Sheet 1

*INVENTOR.*
JESSE B. THOMAS
BY
*Arthur J. Robert*
ATTORNEY

July 2, 1963 J. B. THOMAS 3,095,843
PASSAGEWAY PANEL EXPANSION APPARATUS
Filed Feb. 13, 1958 3 Sheets-Sheet 2

INVENTOR.
JESSE B. THOMAS
BY
ATTORNEY

July 2, 1963  J. B. THOMAS  3,095,843
PASSAGEWAY PANEL EXPANSION APPARATUS
Filed Feb. 13, 1958  3 Sheets-Sheet 3
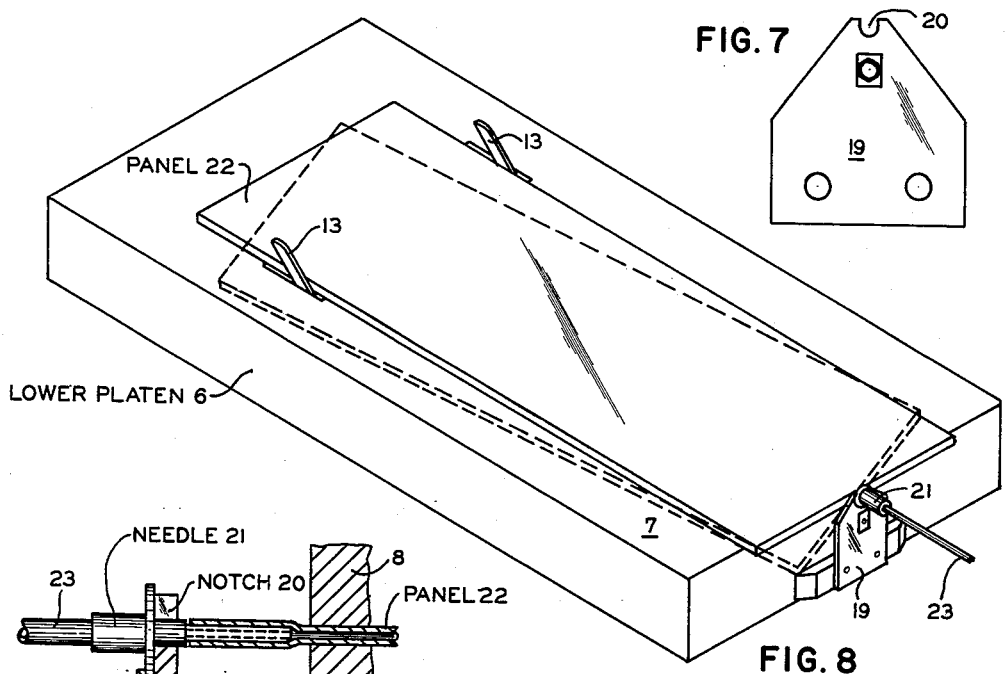
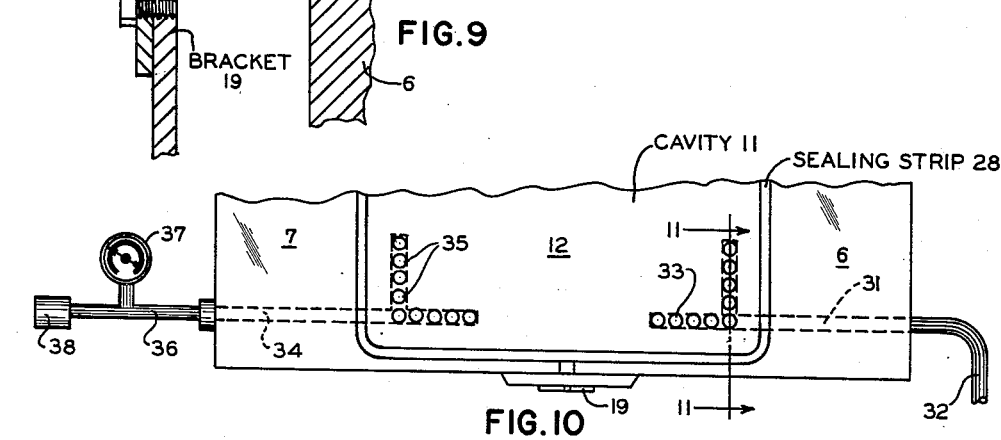
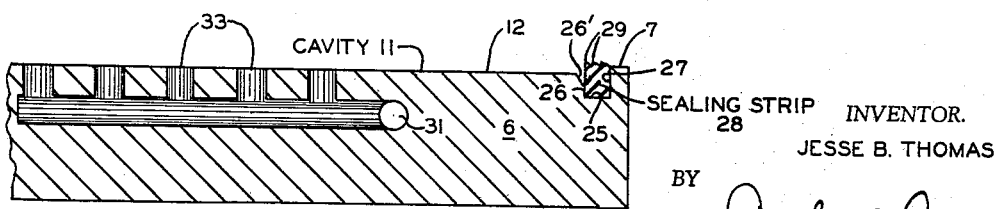
INVENTOR.
JESSE B. THOMAS
BY
Arthur J Robert
ATTORNEY

United States Patent Office 3,095,843
Patented July 2, 1963

3,095,843
PASSAGEWAY PANEL EXPANSION APPARATUS
Jesse B. Thomas, Louisville, Ky., assignor to Reynolds Metals Company, Richmond, Va., a corporation of Delaware
Filed Feb. 13, 1958, Ser. No. 715,108
3 Claims. (Cl. 113—44)

This invention relates to apparatus for expanding the passageways of a pressure welded passageway panel blank on one side only.

The conventional apparatus for expanding passageway panels on one side only, comprises: an upper "flat" platen; a lower platen having a pan-like holding pressure cavity into which one side of a panel is to be expanded; a sealing ring encircling the operative portion of the cavity into which said panel expands; and a hydraulic press for movably supporting the platens. In operation: a passageway panel blank is positioned between the platens to cover the cavity; the upper flat platen is lowered to clamp the panel between platens and provide a seal between the panel and the lower platen along the periphery of the operative portion of the cavity; a holding liquid under pressure is then admitted into the cavity to press the panel upwardly and hold its upper face flatly against the upper platen; and an expansion liquid under higher pressure is then admitted into the unwelded internal areas of the panel to expand the passageway walls of its lower face downwardly into the cavity. After the panel is expanded, the hydraulic holding and expansion pressures are released, the press is operated to raise the upper platen and the expanded panel is removed. This process is explained in applicant's patent application, Serial No. 511,358, filed May 26, 1955, now Patent No. 3,003,228 granted Oct. 10, 1961.

In attempting to practice this process with the facility and speed required for commercial operation, a number of difficulties have been encountered. For example, it is difficult to center each panel quickly and accurately over the cavity while maintaining only a small spacing between platens. This is highly desirable in order to reduce the amount of time and power spent raising and lowering the upper platen while also insuring that the holding liquid inlet opening of the cavity is not blocked or closed off by the expanding passageway walls. It is also desirable but difficult to ascertain the holding pressure in the cavity quickly and accurately. In this connection, it may be noted that one cannot rely on the magnitude of the holding pressure in the conduit which feeds the holding fluid to the cavity. It is difficult to provide a gasket seal which is durable, not readily displaced during the insertion and removal of the panels and not likely to interfere with the flush seating of the panel on the lower platen along the marginal portions or "shores" of its cavity.

The principal object of this invention is to overcome the foregoing difficulties and produce a highly commercial operation.

Another important object of this invention is to provide a one side expansion method and means which will permit or enable one or more of the following operations or results to be accomplished, namely: it will permit an operator to center a panel easily, quickly and accurately over the cavity in the lower platen while the platens are narrowly spaced, it will permit the holding pressure to be introduced into the cavity without any danger of its being blocked by the expanding passageway walls; and it will enable the true holding fluid pressure in the cavity to be measured independently of the holding fluid pressure in the conduit conveying the holding pressure fluid to the cavity.

Another important object is to provide a practical seal arrangement for the lower cavitied platen which is durable, is not easily displaced during the removal and insertion of the panels and will not interfere with the flush seating of the panel on the marginal portions of the cavitied platen.

One important object of my invention is achieved by yieldably mounting a positioning means on one platen for movement from a retracted position within the platen to a relatively projecting position wherein it extends into the space between platens along one edge of that predetermined panel-receiving area, which a panel must occupy when properly positioned, so as to engage and guide the corresponding edge of the panel as it is moved into that area. Also, in accordance with my invention, the cavity is provided with a multiplicity of inlet openings and with a pressure gauge connection independent of the holding pressure inlet connection to the cavity. The spacing of the inlet openings insures the maintenance of an open connection between the cavity and the source of holding pressure while the independent gauge connection insures a measurement of the true holding fluid pressure within the cavity as distinguished from that pressure of the holding fluid which is within the holding liquid conduit leading to the cavity. Finally, I have found that a highly practical seal capable of effectively sealing a hydraulic holding fluid between pressures ranging up to several thousand p.s.i. can be obtained simply by press fitting an elongate strip of resilient rubber-like sealing material of rectangular cross-section (e.g. ½" wide x ⅝" deep) into a groove whose width is slightly less than that of the strip and whose depth is sufficient to insure that the strip will be firmly gripped in the groove. The groove side wall nearest the cavity is released at its top by a beveled edge to allow room for the sealing strip to expand inwards toward the cavity under compression.

The invention is illustrated in the accompanying drawings wherein:

FIG. 7 is an elevational view of a notched bracket which the expansion fluid pressure needle inserted in the front edge of a panel rests in while the panel is being expanded;

FIG. 8 is a perspective view of the lower platen of the press showing a panel properly located on it in solid lines and a panel improperly located on it in dotted lines;

FIG. 9 is a central longitudinal section of the front end of a panel showing it clamped between the press platens and with its expansion fluid pressure needle resting in the notched bracket on the front of the press;

FIG. 10 is an enlarged plan view of the front end of the lower platen; and

FIG. 11 is a section taken on lines 11—11 of FIG. 10.

Figure 1:
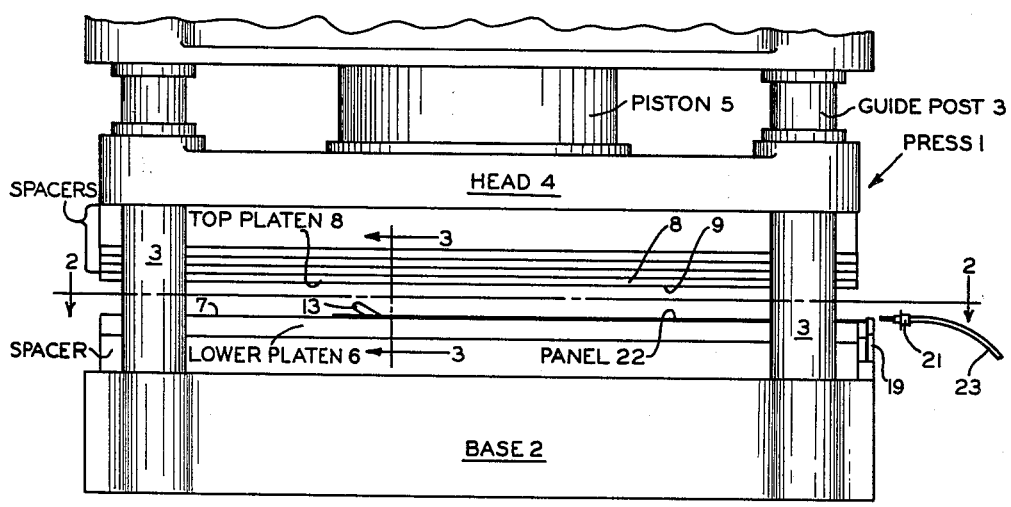
FIG. 1 is a side elevational view of a one-side panel expansion press constructed in accordance with the present invention.
Figure 2:
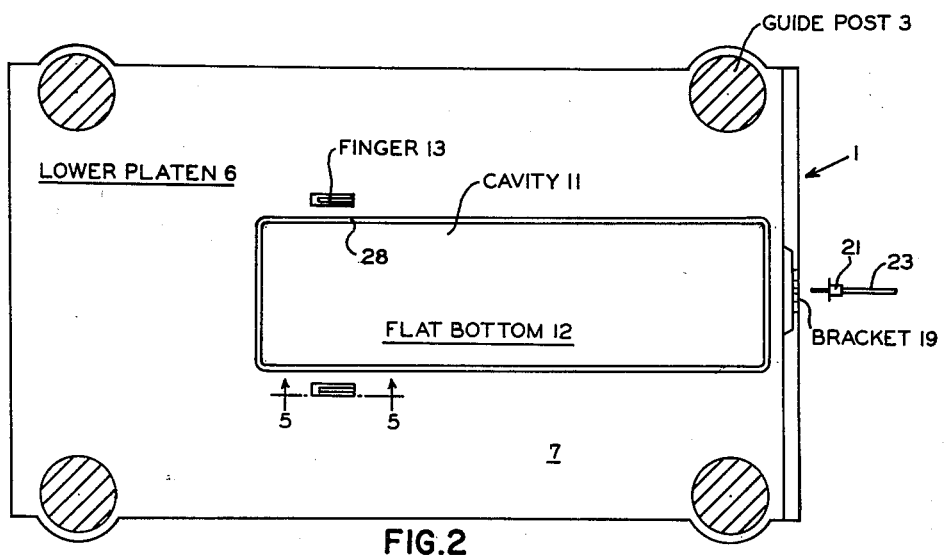
FIG. 2 is a section taken on lines 2—2 of FIG. 1.
Figure 3:
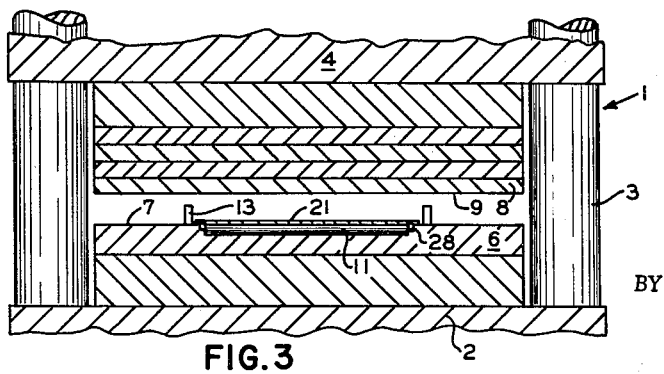
FIG. 3 is an enlarged section taken on lines 3—3 of FIG. 1.
Figure 5:
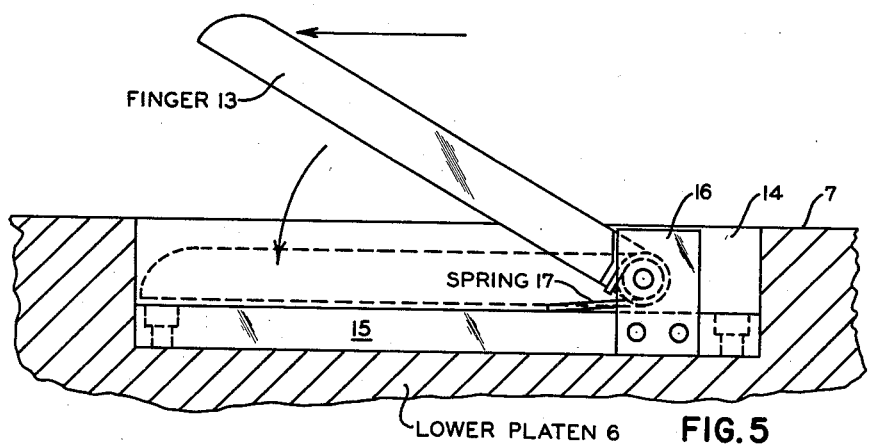
FIG. 5 is an enlarged section taken on lines 5—5 of FIG. 2.
Figure 6:
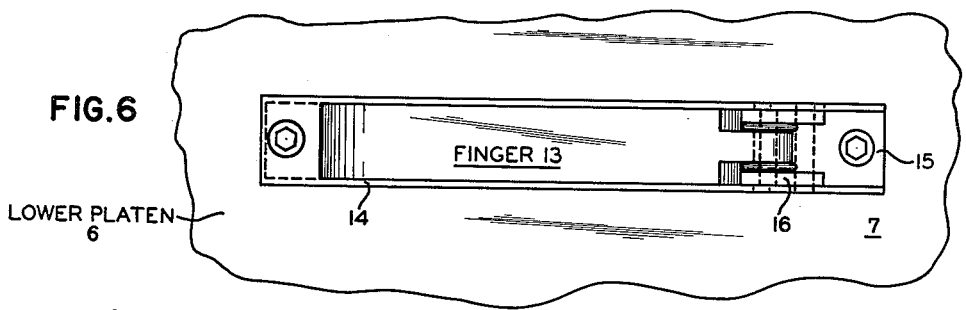
FIG. 6 is a plan view of FIG. 5.

A hydraulic press 1, such as is used for expanding panels on one side, is shown in FIG. 1. It conventionally includes: a lower stationary base 2; upright guide posts 3 positioned at each of the four corners of the base 2; a head 4 slidably mounted for vertical movement toward and away from the base 2, the head being guided by the posts 3 during such movement; a hydraulic motor-driven piston 5 for pressing the head downwardly toward the base 2 with a large force; a lower platen 6 having an upwardly facing platen surface 7; an upper platen 8 having a downwardly facing platen surface 9; and an additional means (not shown) for raising the head 4 and upper platen 8 upwardly away from the base 2 and lower platen 6. In a commercial embodiment of this apparatus, applicant has successfully used a press capable of exerting a maximum compression force of 2500 tons.

The platen surface 7 of the lower platen 6 includes a shallow pan-like cavity 11 having a flat bottom 12. During the expansion operation, the passageway panel should occupy a predetermined position in which its unwelded potential passageway areas extend over the cavity 11 while its welded marginal portion rests upon the "shores" of the cavity i.e., that portion of the surface of which surrounds the cavity 11 of the platen 6.

Figure 4:
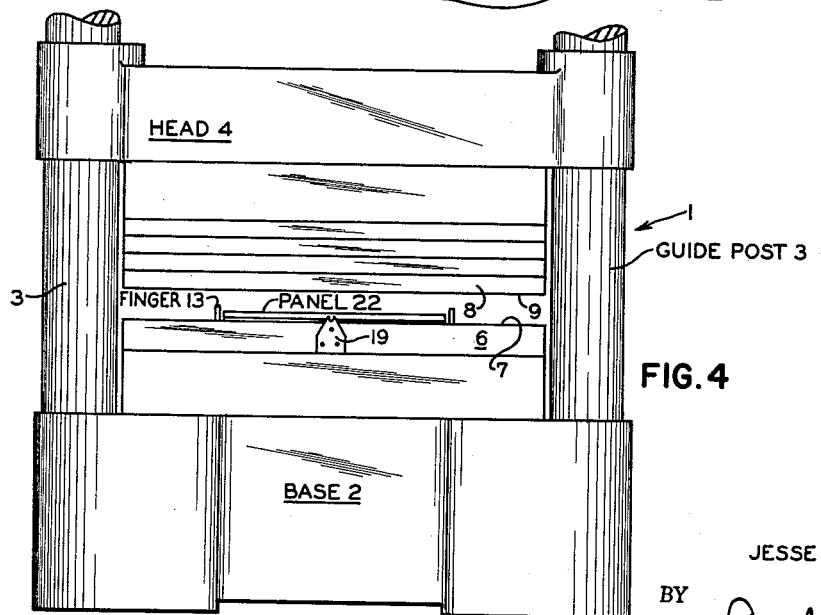
FIG. 4 is a front elevational view of the press of FIG. 1.

Each panel is normally inserted into and removed from the press by an operator standing in front of the press as seen in FIG. 4. During this operation, the platens should be spaced no more than three inches apart. This is enough to permit a panel to be removed or inserted easily and quickly but it is not enough to permit the operator readily to see the position which the rear end portion of the panel occupies relatively to the predetermined position its rear end should occupy on the lower platen 6. If the operator is to locate the rear end correct position visually, the press and platens must be opened to a much greater degree particularly where the passageway panels are say six (6) feet long, which is not unusual. The additional movement involved where the spacing of the platens is greater, is undesirable because it requires additional power and additional time which decreases the production rate and increases the production cost of the passageway panels.

In accordance with one feature of my invention, a positioning means is yieldably mounted on one platen for biased movement from a retracted position, in which it is substantially wholly confined within one platen, to a projecting position, in which it projects into the space between platens to extend along one edge of the rear end portion of the predetermined area which the rear end portion of a properly positioned panel should occupy, or in position to engage and stop the corresponding side edge of the rear end portion of the panel as it is moved into said area. While only one positioning means is necessary, two are illustrated, one for each of the opposite side edges of a given panel or panel-receiving area. The retracted position, which the yieldable positioning means normally occupies only when the platens are closed, may be defined, in relation to the space between platens when they are open, as being along one (platen-face) side of that open space.

The positioning means illustrated comprises: a pair of gauge fingers; a mounting bracket for each finger; and a biasing spring for each finger. Each gauge finger 13 is pivotally connected to the lower platen at opposite sides of the cavity 11 adjacent the rear end thereof. The fingers are spaced apart a distance slightly greater than the width of the panels; hence, a panel can rest on the bottom platen between fingers without interfering with their movement.

In the retracted position, each finger 13 is wholly confined within a cut-out or notch 14 formed in the platen. A finger mounting bracket 15 is fixed in the bottom of each cut-out or recess 14 by threaded fasteners. Each bracket 15 has a pair of upstanding spaced flanges 16 supporting a horizontal pin on which the gauge finger 13 is pivoted. A spring 17 acts against the pivoted end of each finger 13 to bias it automatically into upwardly slanted projecting position wherein an abutment on its pivoted end engages the bracket flanges 16, to hold the finger at an angle of about 30° with the lower platen 6. When the press platens 6 and 8 close, the fingers 13 are forced downwardly against their respective springs 17 into their respective cut-outs 14.

The fingers 13 center the rear end portion of the panel transversely. To center its front end transversely and the entire panel longitudinally, the front end of the lower platen is provided with a second positioning means comprising a fixed vertical bracket 19 forming a fixed reference point by which a given point at the front end edge of the panel may be accurately positioned both transversely and longitudinally.

The vertical bracket 19 is fixedly secured to the front end of the lower platen 6 at a desired location which, for the apparatus illustrated, is mid-way between the side edges of the lower platen 6. This bracket 19 has, in its top edge, an upwardly open notch 20 which is adapted to receive and support the inflation needle 21 of a pressure welded passageway panel 22 when that panel is properly positioned between platens for expansion. The expansion or inflation needle 21, which forms the outlet end of an expansion liquid hose 23, is inserted into the front-end edge inlet opening of the system of unwelded passageway-forming areas of the panel 22 to connect that system to a suitable source supply for expansion liquid under pressure.

A pair of cooperating yeldable jaws are mounted on the front ends of the platens 6 and 8, each jaw being mounted on one platen. The jaw mounted on the lower platen 6 is located between the bracket 19 and the lower platen front end. These jaws clamp on the inlet opening portion of the front edge of the panel surrounding the inflation needle 21, in the closed position of the platens, to eliminate leakage between the needle and the panel inlet opening walls. These yieldable jaws are not shown in the drawing as they are old and conventional.

With the press 1 in its "open" position, a panel 21 is inserted between platens from the front end of the press and moved rearwardly. If the rear end of the panel is properly aligned with its ultimate expansion position, it will slide rearwardly between spaced fingers 13 and reach its predetermined position when its front end needle 22 is properly positioned in notch 20 of bracket 19 (see FIG. 9). If the rear end is not properly aligned, as will usually be the case, its rear edge will ride rearwardly over one of the guide fingers 13 thereby depressing and concealing it. This makes it easy for the operator to "see" that the panel is not properly positioned.

But even without seeing the rear end of the panel, the operator can quickly determine whether or not it is properly positioned simply by attempting to swing its rear end transversely. If transverse movement is prevented by the fingers, then the panel is properly aligned with and located in its predetermined position. But, if the panel can be swung transversely, it is not properly aligned. However, by transversely swinging its rear end in the appropriate direction to the appropriate degree, which usually will be relatively slight, one of its long side edges will be quickly brought into contact with the other guide finger 13. When this occurs, the panel will have cleared the depressed finger enough to release it whereupon it springs into its projecting position. Here both fingers cooperate to prevent the panel from moving transversely out of alignment with its predetermined position. Since the needle 22 is properly located in notch 20, the press may be "closed" upon the panel to clamp it in its proper expansion position.

A continuous groove 25 is provided in the lower platen 6 along the border of the flat bottom 12 of the cavity 11. The depth of the groove is at least equal to and preferably greater than its width. The bottom wall (also designated 25) of the groove 25 is parallel to and located below the level of the flat bottom 12 and the sidewall 26 on the inner side of the groove extends upwardly to join the flat bottom 12 along a beveled edge 26' as shown in FIG. 10. The outer sidewall 27 of the groove is parallel to the inner side wall 26 and extends upwardly to join the operative surface 7 of the platen 6 surrounding the cavity 11.

An elastic sealing strip 28 of rubber or similar material is pressed into a tight frictional fit within and throughout the length of the groove 25 so as to encircle the cavity 11 continuously. This strip projects slightly above the surrounding operative surface 7 of the platen 6. The top of the strip 28 is provided with several sawtooth shaped ribs 29 (three shown) extending longitudinally along the length of the gasket. Only the ribs 29 project above the operative surface 7 which forms the upper limit of the cavity. When the panel is pressed downwardly against the sealing strip 28 to cover the cavity 11, the ribs 29 are compressed and bent slightly inward toward the cavity 11 to form a tight seal. I have obtained good results with a sealing strip of .445″ wide x .675″ high press fitted in a groove of slightly smaller width and about equal depth (0.40 to 0.50″) measured from the bottom of the cavity to the bottom of the groove. In this arrangement, the beveled edge 26′ is inclined at 45° and provides a V-shaped clearance space which is about .125″ wide at its top between the cavity bottom 12 and the sealing strip 28. This V-shaped clearance space allows the sealing strip to expand inward toward the cavity under compression. The sealing strip need not be an endless strip. If its length is such that its opposite end faces lie closely adjacent to or loosely abut each other, its elongation under clamping pressure will force the end faces into engagement with each other sufficiently to seal the holding chamber at this point in a leak proof manner.

The platen 6 is provided with an internal passageway 31 extending between one of its side edges and the cavity bottom 12 for conveying holding fluid pressure into the cavity 11 as seen in FIGS. 10 and 11. A holding fluid pressure hose 32 is connected to the outer end of the passage 31 at the side of the platen 6. To avoid any possibility of blocking the entry of expansion liquid to the cavity, the inner end of the passage 31 is connected to the cavity through a series of short vertical branch conduits 33 opening upwardly through the flat bottom 12 of the cavity at a series of spaced points. Preferably, half of the short branch conduits 33 are arranged in a line extending transversely across the platen 6 and the other half in a line extending longitudinally of it. The plural conduits 33 insure that free communication will continue between the cavity and the holding fluid pressure source even though some of the conduits 33 may be covered by the expanding passageway walls of the panel 22 during its expansion.

A second internal passage 34 is provided in the platen 6 at its opposite side edge and opens at its inner end into the cavity 11 through a second series of branch conduits 35 which are arranged like the branch conduits 33. A pipe 36 is connected to the outer end of the passage 34, and, in turn, is connected to pressure sensing devices, such as a pressure gauge 37, and a pressure switch 38. By this arrangement, the pressure gauge 37 and switch 38 will be operated by the true pressure in the cavity 11 and not by the pressure in the hose 32. Thus, if the hose 32 is obstructed, the gauge 37 and switch 38 will still sense the actual pressure in the cavity 11, while if they were connected to the hose 32, as is conventional, they would sense a different pressure from that in the cavity and as a result, provide a false indication of the cavity pressure.

Having described my invention, I claim:

1. An apparatus for expanding passageway panels comprising:
 A. a press having
  (1) a pair of opposed platens mounted for relative movement between
   (a) an open position, in which they are openly spaced to permit an unexpanded panel to be interposed between them and operatively located in a predetermined expansion position, and
   (b) a closed position, in which they are closed upon said interposed and operatively located panel to clamp it in said predetermined expansion position, and
  (2) a front end through which an unexpanded panel is inserted and moved longitudinally rearward between said open platens,
  (3) one of said platens having
   (a) a holding pressure cavity into which the adjacent side of said interposed and operatively located panel is to be expanded, and
   (b) a continuous groove encircling said cavity;
 B. panel positioning means located along one longitudinally extending side edge of said predetermined position and mounted on one platen for movement, when said platens are open, between
  (1) a retracted position, along one platen-face side of said open space between open platens, and
  (2) a projecting position, in which said positioning means projects into the said open space be-said open platens and is operative,
   (a) when engaged by the rear edge of the panel during its longitudinally rearward insertion movement between open platens, to be retracted sufficiently to allow further rearward movement of said panel, and
   (b) when engaged by the side edge of the panel, to align it longitudinally with said predetermined expansion position; and
 C. a resilient sealing strip extending lengthwise along said groove and widthwise across said groove,
  (1) said strip being anchored in said groove to project heightwise in a direction proceeding outwardly away from said one platen and toward the other platen sufficiently to insure, upon the closure of said platens, compressive sealing contact between the outermost face of said strip and said interposed operatively located unexpanded panel,
  (2) said strip having on its outermost face at least two laterally spaced saw tooth ribs extending longitudinally along the length of the strip.

2. The apparatus of claim 1 wherein:
 A. said strip is of general rectangular cross section; and
 B. the width of said groove is less than the width of said strip to insure a compressive grip on said anchored strip for strip anchoring purposes.

3. The apparatus of claim 1 wherein:
 A. said groove has a pair of side walls and the side wall nearest said cavity has its upper edge beveled to allow room for the sealing strip to expand laterally inward toward said cavity as said compressive contact develops.

References Cited in the file of this patent

UNITED STATES PATENTS

| | | |
|---|---|---|
| 429,349 | Hobson et al. | June 3, 1890 |
| 779,664 | Nelson | Jan. 10, 1905 |
| 785,116 | Perry | Mar. 21, 1905 |
| 839,839 | Hallowell | Jan. 1, 1907 |
| 1,228,617 | Stigberg et al. | June 5, 1917 |
| 1,354,785 | Strand | Oct. 5, 1920 |
| 1,415,838 | Griffiths et al. | May 9, 1922 |
| 1,689,881 | Leck | Oct. 30, 1928 |
| 2,117,807 | Jesser | May 17, 1938 |
| 2,119,960 | Price | June 7, 1938 |
| 2,142,445 | Helwig | Jan. 3, 1939 |
| 2,284,773 | Sivian et al. | June 2, 1942 |

(Other references on following page)

UNITED STATES PATENTS

| | | |
|---|---|---|
| 2,339,032 | Schlenzig | Jan. 11, 1944 |
| 2,399,775 | Whistler et al. | May 7, 1946 |
| 2,442,338 | Borkland | June 1, 1948 |
| 2,565,949 | Clifford et al. | Aug. 28, 1951 |
| 2,582,358 | Schoellerman | Jan. 15, 1952 |
| 2,615,411 | Clevenger et al. | Oct. 28, 1952 |
| 2,935,038 | Chatten | May 3, 1960 |
| 3,003,228 | Thomas | Oct. 10, 1961 |

FOREIGN PATENTS

| | | |
|---|---|---|
| 695,640 | Great Britain | Aug. 12, 1953 |